Oct. 20, 1970 JAMES E. WEBB 3,534,585
ADMINISTRATOR OF THE NATIONAL AERONAUTICS
AND SPACE ADMINISTRATION
MICROBALANCE INCLUDING CRYSTAL OSCILLATORS FOR
MEASURING CONTAMINATES IN A GAS SYSTEM
Filed Dec. 7, 1967 2 Sheets-Sheet 1
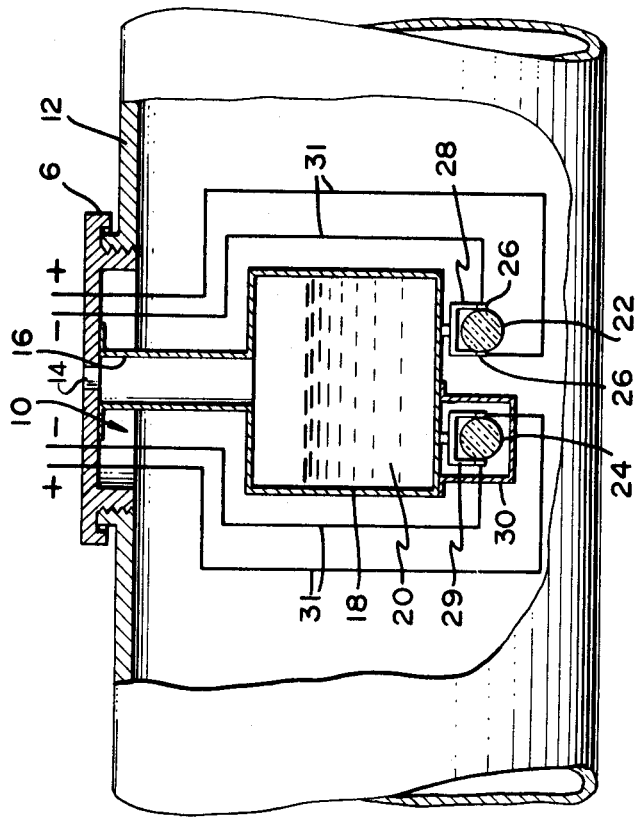
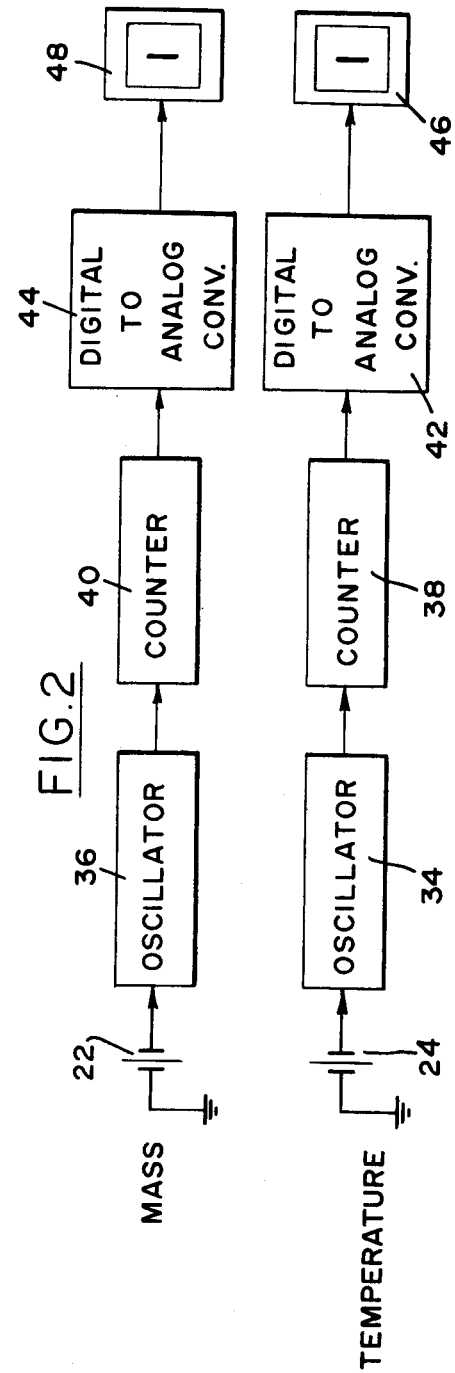
INVENTOR.
JAMES B. STEPHENS
BY
ATTORNEY

JAMES B. STEPHENS
INVENTOR.

BY
ATTORNEY

United States Patent Office 3,534,585
Patented Oct. 20, 1970

3,534,585
MICROBALANCE INCLUDING CRYSTAL OSCILLATORS FOR MEASURING CONTAMINATES IN A GAS SYSTEM
James E. Webb, Administrator of the National Aeronautics and Space Administration, with respect to an invention of James B. Stephens, La Crescenta, Calif.
Filed Dec. 7, 1967, Ser. No. 688,805
Int. Cl. G01n 29/02
U.S. Cl. 73—29                                8 Claims

ABSTRACT OF THE DISCLOSURE

An instrument for detecting the presence of condensible gas contaminates in vacuum apparatus is disclosed. The instrument consists of two piezoelectric quartz crystals mounted on a support fixed to a cryogenic container. One of the crystals is frequency sensitive to changes in mass while the other is frequency sensitive to changes in temperature. The latter crystal is shielded from the flow of condensible gas contaminates. Associated electronic equipment is provided to energize the crystals and to record changes in frequency thereof. In a second embodiment the frequency response from the temperature crystal is converted to an analog signal and delivered to a variable radiation heater which projects an equal amount of radiation on each of the crystals to effectively balance the radiation load playing on the faces thereof.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

The present invention relates to a crystal microbalance and more particularly to a cryogenic quartz crystal microbalance especially useful in determining the presence of condensible contaminates in extremely high vacuum apparatus.

Description of the prior art

In order to study the surface effects of the vacuum conditions of outer space on equipment it is necessary to create vacuum chambers simulating the molecular sink of outer space in which so few molecules remain that monolayer impingement phenomena can be observed and measured. Molecular sink simulation facilities have been constructed including a wedge fin molecular trap array which has been shown to provide capture of all but a few out of every ten thousand condensible molecules (99.97%) of $H_2O$, $CO_2$, CO, oil etc. emanating from the test item before they can restrike it. This ratio and the actual outgassing rate of the test item determine the monolayer formation time at the surface of the test item. It is therefore essential that vacuum pumping equipment work at maximum efficiency and that the equipment does not contribute any contaminating molecules to the vacuum chamber.

A method previously utilized to determine the presence of condensible contaminates in the line from the vacuum chamber to the pump was cumbersome and inexact. Glass slides were interposed in the line allegedly to collect condensible contaminates on the surface of the slide. The slides were removed from the line, washed in solvent which was analyzed by spectroscopy or chromotgraphy for the presence of contaminates. This procedure was laborious, time-consuming, and only provided intermittent, non-absolute monitoring of the line.

OBJECTS AND SUMMARY OF THE INVENTION

It is therefore an object of this invention to provide a microbalance for detecting condensible contaminates in ultra-high vacuum apparatus.

Another object of the invention is to readily and easily provide absolute and quantitative detection of vacuum pump contamination.

A further object of this invention is a provision of a relatively inexpensive yet very sensitive apparatus for the remote and continuous indication of the presence of condensible contaminates in a vacuum line.

These objects and many of the other attendant advantages of this invention will become appreciated as the description proceeds.

The microbalance detector of the invention includes a gauge element comprising a set of piezoelectric crystals, one being frequency sensitive to changes in mass and the other to change in temperature. Means are provided for cooling both crystals to a constant temperature below the condensation temperature of the contaminates and electronic means are provided for energizing the crystals and for sensing and recording the change in frequency of each crystal. The temperature sensitive crystal is also sensitive to changes in mass and therefore this crystal is shielded from the flow of condensible molecules. The mass sensitive crystal is relatively insensitive to changes in temperature but at the sensitivity level desired an indication of temperature is necessary to determine whether or not the change in frequency of the mass sensitive crystal is due solely to a change in mass. The effect of radiation and temperature change can be further minimized by means of a variable radiation heater which in response to a feed back signal from the temperature sensing and recording oscillatory circuit delivers an equal radiation load to each crystal to effectively balance the incoming radiation load playing on the front surfaces of the crystal.

BRIEF DESCRIPTION OF THE DRAWINGS

The invention will become better understood by reference to the following detailed description when considered in connection with the accompanying drawings in which:

FIG. 1 is a front view partly in section of a first embodiment of the microbalance of the invention shown mounted in a vacuum line;

FIG. 2 is a block diagram of the microbalance crystals and associated electronic equipment for energizing the crystals and for sensing and recording changes in frequency;

DESCRIPTION OF THE PREFERRED EMBODIMENTS

Figure 3:
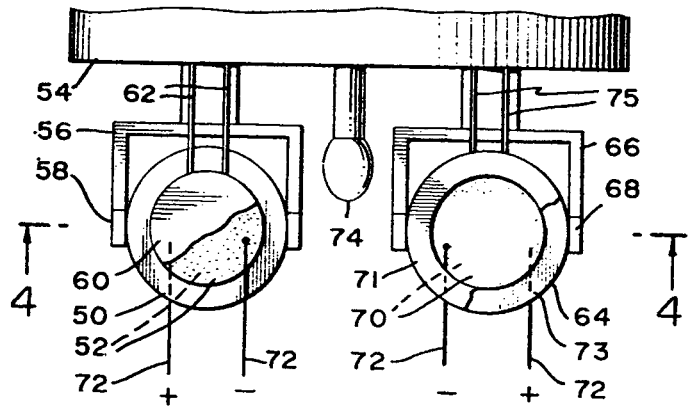
FIG. 3 is a front elevational view of a further embodiment of the invention.

Referring now to FIG. 1 the crystal microbalance of the invention includes a casing 6 having external threads adapted to be inserted into an orifice 10 in pipe 12. The casing contains a central aperture 14 below which is attached by welding the neck 16 of a vessel 18 containing a cryogenic liquid 20.

A pair of quartz crystals 22 and 24 vibrating in the thickness shear mode are attached to the bottom of the cryogenic vessel 18 by means of spring clip holders 26 and U-shaped brackets 28 and 29. The temperature sensitive crystal 24 is encased in a housing 30 that shields it from the flux of condensible contaminates. The other crystal 22 is uncontained and open to receive the flow of condensible contaminates so that a change in mass results in the deposit of contaminates upon the face of the crystal. Low capacitance (100 pf.), mechanically restrained leads 31 are fed through the walls of the pipe 12 to an oscillatory and recording circuit.

A suitable piezoelectric crystal that is frequency sensitive to changes in mass is an oscillating quartz crystal cut to the A-T thickness shear mode. By selecting the proper angle of the A-T cut the crystal will operate at a zero temperature coefficient point or turnover temperature, i.e., there will be no change in frequency with small change in temperature. Such a crystal can operate with sensitivities of $10^{-10}$ g./cm.$^2$ whereas a gas monolayer is approximately to the $10^{-8}$ g./cm.$^2$. The temperature sensitivity of a crystal with cut of 39°49' is about 1 part in $10^7$.

Though properly cut quartz crystals can be very sensitive, repeatable and fast thermometers, they are nonlinear in the cryogenic region. However, in the present microbalance detector when one is primarily interested in a constant temperature testing environment, a quartz crystal cut in the same mode as the mass sensitive crystal and of similar geometry will, when disposed in the same path as the other crystal, give an immediate indication of movement from constant temperature conditions. A quartz crystal with an A-T cut of 35°10' will register a change in frequency of 400 hertz for each change in a ° F. of temperature. A quartz cut along the Y axis will exhibit a similar frequency sensitivity to changes in temperature. The temperature sensitive crystal is also sensitive to changes in mass and therefore it is shielded from the effects of the condensation of gas contaminates by a radiation transparent shield.

With reference to FIG. 2 both crystals 22, 24 are connected as the frequency control elements of oscillator circuits outputs from which they are respectively converted to pulses which can be applied to respective counters 38, 40. The output from each of the counters 38, 40 is fed to a digital to analog converter 42, 44 so that strip recorders 46 and 48 may display the change in frequency on a strip chart.

In operation, crystals with A-T cuts selected to correspond to the temperature of the cryogenic liquid are mounted in spring clips on the U-shaped brackets on the bottom of the cryogenic vessel. The device is placed into the orifice and the cryogenic liquid placed into the vessel. As the air is pumped out of the vacuum chamber, any contaminates back-streaming into the chamber will be condensed upon the mass determining crystal 22 thereby reducing the frequency with which it vibrates. This change in frequency is found to be proportional to changes in mass within 1% accuracy for frequency shifts of 1%. Sensitivities of $10^{-10}$ grams per square centimeter have been obtained. As the presence of mass is being determined by means of the frequency response of mass sensitive crystal 22 and its associated frequency determining circuit, the frequency response of the other crystal 24 is observed and the absence of variation in its frequency response is utilized to indicate the accuracy of the response of the mass determining crystal. Thus mass determination is only accurate during periods of constant temperature. From experimental data it has been established that for a 10-mc. crystal, a change in mass (g./cm.$^2$) is determined by multiplying the change in frequency (c.p.s.) by 4.42 times $10^{-9}$. Utiliznig the quartz crystal microbalance detector of FIG. 1 while pumping down a molsink simulator with a turbo-molecular mechanical vacuum pump rated as clean by the manufacturer it was found that considerable quantities of oil molecules were back-streaming into the chamber.

Figure 4:
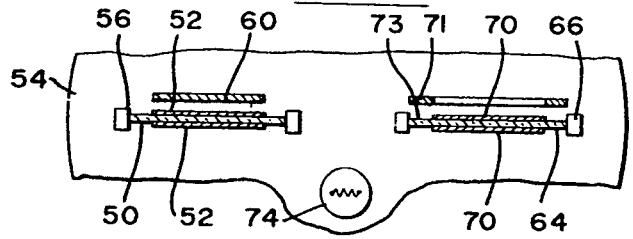
FIG. 4 is a sectional view taken along line 4—4 of FIG. 3.
Figure 5:
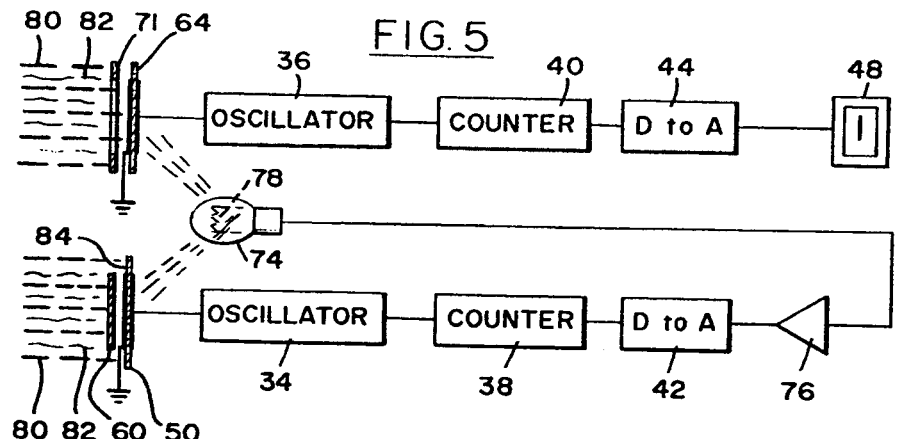
FIG. 5 is a block diagram of the associated electronics of the embodiment of FIG. 3.

The variable effect of radiation and temperature response of the detector of the invention can be further minimized by the embodiment illustrated in FIGS. 3, 4, and 5.

With reference now to FIGS. 3 and 4 the crystal microbalance includes a first quartz crystal 50 frequency sensitive to changes in temperature. Metal electrodes 52 are deposited on opposite faces of the crystal 50. The metal electrodes may be aluminum, gold, or silver and are conveniently formed by evaporation onto the surface of the crystal. The electrodes are coated onto about 50% of the surface area of the face of the crystal. The crystal is supported on a cryogenic finger 54 by means of a U-shaped clamp 56 and spring clips 58. A radiation and molecular flux mask disc 60 is mounted in front of and substantially covers the entire electrode area, 50 percent of the face of the crystal exposed to the changes in radiation by means of support rods 62.

A mass sensitive crystal 64 is mounted adjacent the temperature sensitive crystal by means of another clamp 66 including spring clips 68. Metal electrodes 70 are coated onto 50% of the surface area of each face of the mass sensitive crystal 64. An annular or ring shaped radiation and molecular mask 71 is positioned in front of the noncoated areas 73 by means of support rods 75 and substantially covers the entire noncoated area 73 of the crystal or about 50 percent of the crystal face. Low capacitance mechanically restrained leads 72 are attached to each electrode and are connected to an oscillatory circuit not shown. Thus, it may be determined disc 60 covers about 50 percent of one face of the central portion of crystal 50, and ring 71 covers about 50 percent of one face of the perimeter portion of crystal 64.

A variable resistance heater 74 is mounted behind the crystals on a line equidistant between them.

With reference now to FIG. 5 the oscillatory circuit for the mass sensitive crystal is identical as discussed above with reference to FIG. 2 wherein the frequency output of the crystal varies the frequency of the oscillator directly in proportion to the amount of contaminate absorbed or adsorbed on the surface. The output of the oscillator is applied to a counter and then to a digital to analog converter and the frequency of the crystal is recorded. With respect to the temperature sensitive crystal 50, the change in frequency due to stray radiation in the system causes a change in frequency which varies the frequency of the oscillator 34. The pulses from the oscillator are counted in the counter 38 and converted to an analog signal in the digital to analog converter 42. This signal is amplified in amplifier 76 and fed back to the variable radiation heater 74. The filament 78 of the heater integrates the feed back signal and radiates an equal amount of radiation to the back face of each of the crystals 50, 64.

It has been found that the frequency response to mass change of a quartz crystal is very limited in the area of the crystal face not covered by the electrodes. It is therefore unnecessary to completely isolate the temperature sensitive crystal from the effects of the molecular flux 80. During operation the molecular flux 80 and the stray radiation 82 can be seen and absorbed by the exposed electrode area of face of the mass sensitive crystal 64. However, with respect to the temperature sensitive crystal 50, the molecular flux 80 will deposit on the mass insensitive non-electrode areas 84 of the crystal. Since this area 84 is equal to the electrode area of crystal 64, an equal amount of stray radiation will be absorbed by the mass sensitive crystal 50.

The quartz crystal microbalance of the invention provides a remote, continuous quantitative and absolute determination of the presence of condensible molecules in a vacuum system. It facilitates molecular sink simulation studies of viability of microorganisms, cold welding mechanisms and degradation of thermal control coatings. The tightness of the vacuum system can be checked by a control leaking of water into the system and collection and measurement of the condensed water on the mass sensitive crystal. Radiation effects are essentially controlled and eliminated by the instrument of the invention.

It is to be understood that the foregoing relates only to a disclosure of preferred embodiments of the invention and that numerous substitutions, alterations and modifications are permissible without departing from the scope of the invention as defined in the following claims.

What is claimed is:

1. An instrument for measuring condensible contaminates in high vacuum apparatus comprising:
   a first electronic oscillator means containing a crystal frequency sensitive to changes in mass and temperature, said crystal containing a thin metal film electrode covering about 50 percent of a front face thereof;
   a first shield member opaque to radiation and impermeable to contaminates disposed in front of and covering the non-electrode area of said front face substantially restricting the crystal sensitivity to mass;
   a second electronic oscillator means containing a crystal frequency sensitive to changes in temperature and mass, said crystal containing a thin metal film electrode covering about 50 percent of a front face thereof equal in area to the non-electrode area of the first crystal;
   a second shield member opaque to radiation and impermeable to contaminates disposed in front of and covering the electrode area of said front face of said second crystal substantially restricting the crystal sensitivity to temperature;
   variable radiation means for heating said crystals;
   cooling means for cooling said crystals;
   means for mounting said crystals on said cooling means with their front faces in the direction of flow of condensible contaminates and for mounting said radiation means behind said crystals;
   first electronic means for sensing the changes in frequency of said first crystal;
   second electronic means for sensing the frequency change of said second crystal;
   means for converting said second sensed frequency signal to an analog signal; and
   means for feeding said signal to said variable radiation means whereby the radiation load on said crystals is varied in response to changes in the frequency of said second crystal.

2. An instrument according to claim 1 wherein said feed back means includes an amplifier.

3. A crystal microbalance for measuring condensible molecular flux in a high vacuum apparatus comprising:
   a first electronic oscillator means containing a first piezoelectric crystal element frequency sensitive to changes in mass and temperature.
   a thin metal film electrode applied to a portion of one face of the first crystal;
   a first shield member opaque to radiation and impermeable to the molecular flux;
   first mounting means supporting the first shield member in front of the non-electrode area of said face and exposing the electrode area of said face, the first shield member covering substantially all of the non-electrode area leaving exposed substantially all the electrode area thereby substantially restricting the crystal sensitivity to mass;
   a second electronic oscillator means containing a second piezoelectric crystal element frequency sensitive to changes in temperatures and mass;
   a second thin metal film electrode applied to a portion of one face of the second crystal, said portion being equal in area to the non-electrode area of the face of the first crystal;
   a second shield member opaque to radiation and impermeable to molecular flux;
   mounting means for supporting the second shield member in front of the electrode area of the face of the second crystal and exposing the non-electrode area of said face, the second shield member covering substantially all of the electrode area leaving exposed substantially all of the non-electrode area thereby substantially restricting the crystal sensitivity to temperature;
   a container for receiving a cryogenic liquid;
   means for mounting both crystals on said container with said faces within the flow of condensible molecular flux; and
   electronic means connected to said oscillators for indicating the change in oscillation thereof.

4. A gauge element according to claim 3 in which both crystals are quartz and the mass sensitive crystal is cut in the thickness shear mode at a selected angle corresponding to the turnover point for the temperature of operation.

5. A gauge element according to claim 4 in which the mass sensitive crystal is cut at an angle of 39°49′ corresponding to a turnover temperature of 77° and the temperature sensitive crystal is cut at an angle of 35°10′.

6. An instrument according to claim 3 in which the electronic indicating means comprises in sequential connection to each oscillator means, a counter, a digital to analog converter and means for recording the output of the converter.

7. A microbalance according to claim 3 in which said faces and electrode portions are equal in area and each electrode covers about one-half the area of each of said faces.

8. A microbalance according to claim 3 further including a vacuum pump and a high vacuum chamber connected by a conduit and said microbalance is disposed within said conduit.

References Cited

UNITED STATES PATENTS

| | | | |
|---|---|---|---|
| 2,017,859 | 10/1935 | Halstead | 73—29 X |
| 2,536,111 | 1/1951 | Van Dyke | 73—17 |
| 3,329,004 | 7/1967 | King | 73—23 |

OTHER REFERENCES

D. Fairweather and R. C. Richards: Quartz Crystals as Oscillators and Resonators, Marconi Telegraph Company, Chelmsford, Essex, 1957, pp. 20–23.

RICHARD C. QUEISSER, Primary Examiner

C. E. SNEE III, Assistant Examiner

U.S. Cl. X.R.

73—23